(12) United States Patent
Kazi et al.

(10) Patent No.: US 9,333,490 B2
(45) Date of Patent: May 10, 2016

(54) ZONED CATALYST FOR DIESEL APPLICATIONS

(71) Applicant: BASF Corporation, Florham Park, NJ (US)

(72) Inventors: M. Shahjahan Kazi, Kendall Park, NJ (US); Fabien A. Rioult, Garwood, NJ (US); Stanley A. Roth, Yardley, PA (US); Kenneth E. Voss, Somerville, NJ (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 14/205,469

(22) Filed: Mar. 12, 2014

(65) Prior Publication Data

US 2014/0271429 A1 Sep. 18, 2014

Related U.S. Application Data

(60) Provisional application No. 61/784,561, filed on Mar. 14, 2013.

(51) Int. Cl.
*B01D 53/94* (2006.01)
*B01J 8/02* (2006.01)
(Continued)

(52) U.S. Cl.
CPC ............... *B01J 23/44* (2013.01); *B01D 53/944* (2013.01); *B01D 53/945* (2013.01); *B01D 53/9454* (2013.01); *B01D 53/9472* (2013.01); *B01J 23/58* (2013.01); *B01J 23/63* (2013.01); *B01J 35/0006* (2013.01); *B01J 37/0248* (2013.01); *F01N 3/103* (2013.01); *B01D 2255/1021* (2013.01); *B01D 2255/1023* (2013.01); *B01D 2255/9032* (2013.01); *B01D 2258/012* (2013.01); *B01J 35/04* (2013.01); *B01J 35/10* (2013.01);
(Continued)

(58) Field of Classification Search
CPC ............ B01J 23/42; B01J 23/44; B01J 21/00; B01J 21/04; B01D 53/945; F01N 13/02
USPC ......... 502/327, 328, 332–334, 339, 355, 439, 502/527.12, 527.13; 423/213.5; 422/171
See application file for complete search history.

(56) References Cited

U.S. PATENT DOCUMENTS

| | | | |
|---|---|---|---|
| 4,335,023 | A | 6/1982 | Dettling et al. |
| 4,961,917 | A | 10/1990 | Byrne |

(Continued)

FOREIGN PATENT DOCUMENTS

| | | |
|---|---|---|
| EP | 2014360 A1 | 1/2009 |
| EP | 2674584 A1 | 12/2013 |

(Continued)

OTHER PUBLICATIONS

English Language Abstract of EP2014360 Jan. 14, 2009.

(Continued)

*Primary Examiner* — Cam N. Nguyen
(74) *Attorney, Agent, or Firm* — Womble Carlyle Sandridge & Rice LLP

(57) ABSTRACT

An oxidation catalyst composite, methods, and systems for the treatment of exhaust gas emissions from a diesel engine are described. More particularly, an oxidation catalyst composite including a zoned diesel oxidation catalyst with a first washcoat zone with a Pt/Pd ratio that is less than 3:1 and a PGM loading at least twice that of a second washcoat zone.

21 Claims, 2 Drawing Sheets

(51) Int. Cl.

| | | |
|---|---|---|
| *C01B 21/00* | (2006.01) | |
| *C01B 23/00* | (2006.01) | |
| *C01B 25/00* | (2006.01) | |
| *C01B 31/00* | (2006.01) | |
| *C01B 33/00* | (2006.01) | |
| *C01B 35/00* | (2006.01) | |
| *C01G 28/00* | (2006.01) | |
| *C01G 30/00* | (2006.01) | |
| *B01D 50/00* | (2006.01) | |
| *B01J 23/00* | (2006.01) | |
| *B01J 23/02* | (2006.01) | |
| *B01J 23/08* | (2006.01) | |
| *B01J 23/40* | (2006.01) | |
| *B01J 23/42* | (2006.01) | |
| *B01J 23/44* | (2006.01) | |
| *B01J 23/56* | (2006.01) | |
| *B01J 23/58* | (2006.01) | |
| *B01J 21/04* | (2006.01) | |
| *B01J 35/00* | (2006.01) | |
| *B01J 23/63* | (2006.01) | |
| *F01N 3/10* | (2006.01) | |
| *B01J 37/02* | (2006.01) | |
| *B01J 35/04* | (2006.01) | |
| *B01J 35/10* | (2006.01) | |

(52) U.S. Cl.
CPC .......... *B01J35/1033* (2013.01); *B01J 35/1061* (2013.01); *B01J 37/0219* (2013.01); *B01J 37/0234* (2013.01); *B01J 37/0244* (2013.01); *B01J 2523/00* (2013.01); *F01N 2510/0682* (2013.01); *Y02T 10/22* (2013.01)

(56) References Cited

U.S. PATENT DOCUMENTS

| | | | |
|---|---|---|---|
| 5,516,497 A | 5/1996 | Speronello et al. | |
| 6,375,910 B1 | 4/2002 | Deeba et al. | |
| 7,576,031 B2* | 8/2009 | Beutel | B01J 23/44 502/326 |
| 7,837,953 B2* | 11/2010 | Shore | 422/626 |
| 7,875,573 B2* | 1/2011 | Beutel | B01J 23/44 423/213.2 |
| 7,947,238 B2* | 5/2011 | Deeba | B01D 53/944 423/213.2 |
| 7,998,424 B2* | 8/2011 | Bergeal et al. | 422/180 |
| 8,141,351 B2 | 3/2012 | Ponnathpur et al. | |
| 8,211,392 B2* | 7/2012 | Grubert | B01D 53/944 423/213.2 |
| 8,216,521 B2* | 7/2012 | Li et al. | 422/177 |
| 8,220,251 B2* | 7/2012 | Oger | B01D 53/945 422/168 |
| 8,246,923 B2* | 8/2012 | Southward et al. | 423/213.5 |
| 8,257,659 B2 | 9/2012 | Simon, III et al. | |
| 8,263,033 B2* | 9/2012 | Dobson | B01D 53/9472 422/177 |
| 8,293,182 B2* | 10/2012 | Boorse et al. | 422/180 |
| 8,524,182 B2* | 9/2013 | Grubert | B01D 53/944 422/180 |
| 8,540,952 B2* | 9/2013 | Swallow et al. | 423/213.2 |
| 8,557,203 B2* | 10/2013 | Bailey | B01D 53/944 422/170 |
| 8,637,426 B2* | 1/2014 | Hoke et al. | 502/339 |
| 8,652,429 B2* | 2/2014 | Sumiya | B01J 37/0244 423/213.2 |
| 8,667,785 B2* | 3/2014 | Blakeman et al. | 60/299 |
| 8,800,268 B2* | 8/2014 | Voss | B01D 53/9413 60/274 |
| 8,802,016 B2* | 8/2014 | Grubert | 422/177 |
| 8,858,904 B2* | 10/2014 | Punke | B01J 37/0248 422/177 |
| 8,925,304 B2* | 1/2015 | Oger | B01D 53/945 422/168 |
| 9,005,559 B2* | 4/2015 | Sumiya | B01J 37/0244 423/213.2 |
| 9,011,783 B2* | 4/2015 | Schuetze | B01D 53/944 422/171 |
| 9,034,286 B2* | 5/2015 | Bergeal | B01D 53/945 422/180 |
| 9,046,022 B2* | 6/2015 | Blakeman | B01J 35/0006 |
| 2009/0137386 A1 | 5/2009 | Pfeifer et al. | |
| 2010/0183490 A1* | 7/2010 | Hoke et al. | 423/213.5 |
| 2010/0257843 A1 | 10/2010 | Hoke et al. | |
| 2011/0123421 A1* | 5/2011 | Grubert | 423/212 |
| 2011/0126527 A1* | 6/2011 | Hilgendorff | 60/299 |
| 2011/0212008 A1 | 9/2011 | Punke et al. | |
| 2013/0149223 A1* | 6/2013 | Blakeman et al. | 423/213.5 |
| 2014/0044626 A1* | 2/2014 | Greenwell | 423/212 |
| 2014/0161679 A1* | 6/2014 | Chiffey | F01N 13/009 422/170 |
| 2015/0098879 A1* | 4/2015 | Oger | B01D 53/945 423/213.5 |
| 2015/0202604 A1* | 7/2015 | Sumiya | B01J 37/0244 422/180 |

FOREIGN PATENT DOCUMENTS

| | | |
|---|---|---|
| WO | WO-2012/079598 | 6/2012 |
| WO | 2014072067 A1 | 5/2014 |

OTHER PUBLICATIONS

English Language Abstract of EP2674584 Dec. 18, 2013.
International Search Report dated Jun. 5, 2014.

* cited by examiner

ZONED CATALYST FOR DIESEL APPLICATIONS

CROSS-REFERENCE TO RELATED APPLICATIONS

This application claims the benefit of priority under 35 U.S.C. §119(e) to U.S. Provisional Patent Application No. 61/784,561, filed on Mar. 14, 2013, which is hereby incorporated by reference in its entirety.

TECHNICAL FIELD

The present invention relates to oxidation catalysts that have zoned designs. More specifically, embodiments are directed to zoned catalyst compositions comprising Pt and Pd on refractory metal oxide supports, and their use for reducing carbon monoxide and hydrocarbon emissions in diesel engine systems.

BACKGROUND

Operation of lean burn engines, for example, diesel engines and lean burn gasoline engines, provide the user with excellent fuel economy and have low emissions of gas phase hydrocarbons and carbon monoxide due to their operation at high air/fuel ratios under fuel lean conditions. Additionally, diesel engines offer significant advantages over gasoline (spark ignition) engines in terms of their fuel economy, durability, and their ability to generate high torque at low speed.

From the standpoint of emissions, however, diesel engines present problems more severe than their spark-ignition counterparts. Because diesel engine exhaust gas is a heterogeneous mixture, emission problems relate to particulate matter (PM), nitrogen oxides ($NO_x$), unburned hydrocarbons (HC), and carbon monoxide (CO).

$NO_x$ is a term used to describe various chemical species of nitrogen oxides, including nitrogen monoxide (NO) and nitrogen dioxide ($NO_2$), among others. NO is of concern because it is believed to undergo a process known as photochemical smog formation, through a series of reactions in the presence of sunlight and hydrocarbons, and is a significant contributor to acid rain. $NO_2$, on the other hand, has a high potential as an oxidant and is a strong lung irritant.

Effective abatement of $NO_x$ from lean burn engines is difficult to achieve because high $NO_x$ conversion rates typically require reductant-rich conditions. Conversion of the $NO_x$ component of exhaust streams to innocuous components generally requires specialized $NO_x$ abatement strategies for operation under fuel lean conditions.

One such strategy for the abatement of $NO_x$ in the exhaust stream from lean burn engines uses $NO_x$ storage reduction (NSR) catalysts, which are also known as "lean $NO_x$ trap (LNT)." The lean $NO_x$ trap technology can involve the catalytic oxidation of NO to $NO_2$ by catalytic metal components effective for such oxidation, such as precious metals. However, in the lean $NO_x$ trap, the formation of $NO_2$ is followed by the formation of a nitrate when the $NO_2$ is adsorbed onto the catalyst surface. The $NO_2$ is thus "trapped", i.e., stored, on the catalyst surface in the nitrate form and subsequently decomposed by periodically operating the system under fuel-rich combustion conditions that effect a reduction of the released $NO_x$ (nitrate) to $N_2$.

Oxidation catalysts comprising a precious metal dispersed on a refractory metal oxide support are known for use in treating the exhaust of diesel engines to convert both hydrocarbon and carbon monoxide gaseous pollutants by catalyzing the oxidation of these pollutants to carbon dioxide and water. Such catalysts have been generally contained in units called diesel oxidation catalysts (DOC), which are placed in the exhaust flow path from a diesel-powered engine to treat the exhaust before it vents to the atmosphere. Typically, the diesel oxidation catalysts are formed on ceramic or metallic substrate carriers (such as, e.g. a flow-through monolith carrier), upon which one or more catalyst coating compositions are deposited. In addition to the conversions of gaseous HC, CO, and the soluble organic fraction (SOF) of particulate matter, oxidation catalysts that contain platinum group metals (which are typically dispersed on a refractory oxide support) promote the oxidation of nitric oxide (NO) to $NO_2$.

Catalysts used to treat the exhaust of internal combustion engines are less effective during periods of relatively low temperature operation, such as the initial cold-start period of engine operation because the engine exhaust is not at a temperature sufficiently high enough for efficient catalytic conversion of noxious component in the exhaust.

Oxidation catalysts comprising a platinum group metal (PGM) dispersed on a refractory metal oxide support are known for use in treating exhaust gas emissions from diesel engines. Platinum Pt is an effective metal for oxidizing CO and HC in a DOC after high temperature aging under lean conditions and in the presence of fuel sulfur. On the other hand, palladium Pd rich diesel oxidation catalysts typically show higher light-off temperatures for oxidation of CO and HC, especially when used to treat exhaust containing high levels of sulfur (from high sulfur containing fuels) or when used with HC storage materials. "Light-off" temperature for a specific component is the temperature at which 50% of that component reacts. Pd-containing DOCs may poison the activity of Pt to convert HCs and/or oxidize $NO_x$ and may also make the catalyst more susceptible to sulfur poisoning. These characteristics have typically prevented the use of Pd-rich oxidation catalysts in lean burn operations, especially for light duty diesel application where engine temperatures remain below 250° C. for most driving conditions.

Oxidation catalysts with high levels of platinum content cause high conversion rates in diesel exhaust gases in the oxidation of NO to form $NO_2$. Oxidation catalysts which have a large amount of palladium can provide nearly complete conversion of high quantities of unburned hydrocarbons in the diesel exhaust gas even at low temperatures. However, aged catalysts with high levels of platinum content have the tendency to quench in the event of high levels of hydrocarbon content, while palladium does not have a sufficient level of NO oxidation activity. Thus, there is a conflict between the NO conversion performance and colder temperature performance. For cost reasons, this conflict cannot be resolved by means of the addition of two noble metals palladium and platinum in the oxidation catalyst. Moreover, platinum and palladium can interact negatively when combined, such that the additive effect is actually lost. Thus, a diesel oxidation catalyst is needed that resolves such conflict. The NO conversion to $NO_2$ can impact the downstream SCR reaction, especially the "fast" SCR reaction, as described below.

As emissions regulations become more stringent, there is a continuing need to develop diesel oxidation catalysts systems that provide improved performance, for example, lower light-off temperature for fuel used in active regeneration of the a downstream diesel particulate filter. There is also a need to utilize components of DOCs, for example, Pd, as effectively as possible.

SUMMARY

A first embodiment pertains to an oxidation catalyst composite for abatement of exhaust gas emissions from a diesel engine comprising: a substrate having a length, an inlet end and an outlet end, a catalytic material on the carrier, the catalytic material including a first washcoat zone and a second washcoat zone; the first washcoat zone comprising a first washcoat layer including platinum Pt and palladium Pd platinum group metal (PGM) components and a first refractory metal oxide support, the first washcoat zone adjacent the inlet end of the substrate; and the second washcoat zone comprising a second washcoat layer including platinum and palladium PGM components and a second refractory metal oxide support, the second washcoat layer adjacent the outlet end of the substrate; wherein the first washcoat zone has a length that is shorter than the second washcoat zone, wherein the oxidation catalyst does not include an elevated PGM loading on the inlet face of the catalyst and the first washcoat zone has a PGM loading at least twice that of the second washcoat zone, and the first washcoat zone has a Pt/Pd ratio less than 3:1.

In a second embodiment, the oxidation catalyst composite of the first embodiment is modified, wherein the second washcoat zone has a Pt:Pd ratio greater than 3:1.

In a third embodiment, the first or second embodiment is modified, wherein the Pt:Pd ratio in the second washcoat zone is greater than 5:1.

In a fourth embodiment, the first through the third embodiments are modified, wherein the Pt:Pd ratio in the second washcoat zone is greater than 8:1.

In a fifth embodiment, the first through the fourth embodiments are modified, wherein the refractory metal oxide support comprises a large pore alumina.

In a sixth embodiment, the fifth embodiment is modified, wherein the alumina is stabilized by doping.

In a seventh embodiment, the first through the sixth embodiments are modified, wherein the washcoat loading is the same in the first washcoat zone and the second washcoat zone.

In an eighth embodiment, the first through the sixth embodiments are modified, wherein the washcoat loading is different in the first washcoat zone than in the second washcoat zone.

In a ninth embodiment, the eighth embodiment is modified, wherein the first washcoat zone comprises a Pt/Pd component in an amount in the range of about 40 g/ft$^3$ to 60 g/ft$^3$.

In a tenth embodiment the eighth or ninth embodiments are modified, wherein the second washcoat zone comprises a Pd/Pd component in an amount in the range of about 15 g/ft$^3$ to 25 g/ft$^3$.

In an eleventh embodiment any of the first through ninth embodiments are modified, wherein the first washcoat zone further comprises an alkaline earth metal in an amount in the range of about 60 g/ft$^3$ to 70 g/ft$^3$.

In a twelfth embodiment, and of the first through eleventh embodiments are modified, wherein the ratio of the length of the second washcoat zone to the length of the first washcoat zone is 1.5:1 or greater.

Another aspect of the invention pertains to a method. In a thirteenth embodiment, a method for treating a diesel exhaust gas stream comprising passing the exhaust gas stream through an inlet end towards an outlet end of a catalyzed soot filter, the exhaust gas first passing through a first washcoat zone on the catalyzed soot filter comprising a first washcoat layer including platinum Pt and palladium Pd components and a first refractory metal oxide support, and then passing the exhaust gas stream through a second washcoat zone on the catalyzed soot filter comprising a second washcoat layer including platinum and palladium components and a second refractory metal oxide support, wherein the first washcoat zone has a length that is shorter than the second washcoat zone, wherein the first washcoat zone has a PGM loading at least twice that of the second washcoat zone, and the first washcoat zone has a Pt/Pd ratio less than 3:1.

In a fourteenth embodiment, the thirteenth embodiment is modified, wherein the second washcoat zone has a Pt:Pd ratio greater than 3:1.

In a fifteenth embodiment, the twelfth through fourteenth embodiments are modified, wherein the Pt:Pd ratio in the second washcoat zone is greater than 5:1.

In a sixteenth embodiment, the twelfth through fifteenth embodiments, wherein the Pt:Pd ratio in the second washcoat zone is greater than 8:1.

In a seventeenth embodiment, the twelfth through sixteenth embodiments can be modified, wherein the washcoat loading is the same in the first washcoat zone and the second washcoat zone.

In an eighteenth embodiment, the twelfth through sixteenth embodiments can be modified, wherein the washcoat loading is different in the first washcoat zone and the second washcoat zone.

In a nineteenth embodiment, the twelfth through eighteenth embodiments can be modified, wherein the oxidation catalyst composite is effective to abate carbon monoxide and hydrocarbons, and to oxidize NO to $NO_2$ from the exhaust gas stream.

A twentieth embodiment pertains to a system for treatment of a lean burn engine exhaust gas stream including hydrocarbons, carbon monoxide, and other exhaust components, the emission treatment system comprising: an exhaust conduit in fluid communication with the lean burn engine via an exhaust manifold; the oxidation catalyst composite of any of the first through nineteenth embodiments wherein the substrate is a flow through substrate or a wall-flow substrate; and a catalyzed soot filter and an SCR catalyst located downstream from the oxidation catalyst composite.

In a twenty first embodiment, the twentieth embodiment is modified so that the SCR catalyst is loaded on the catalyzed soot filter.

DETAILED DESCRIPTION

Figure 1:
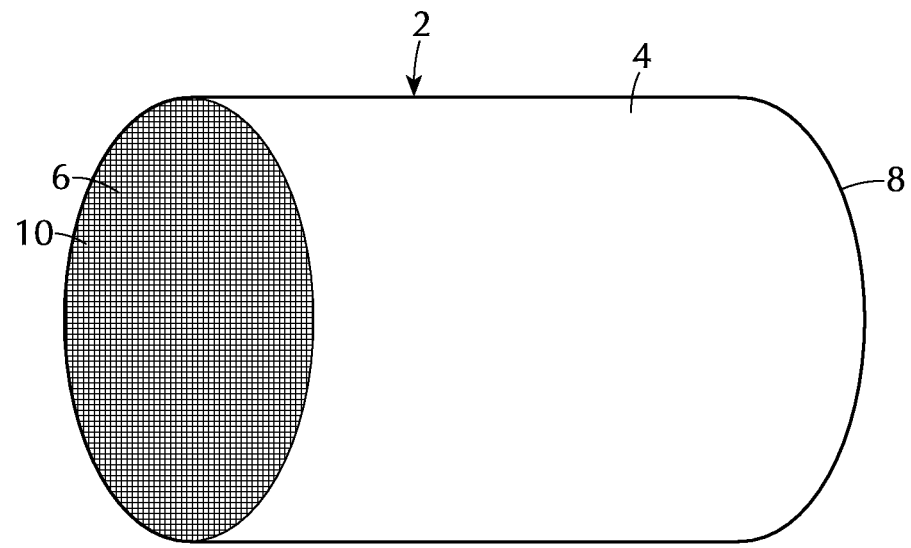
FIG. 1 is a perspective view of a honeycomb-type refractory carrier member which may comprise oxidation catalyst composites in accordance with one or more embodiments.

Before describing several exemplary embodiments of the invention, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as discloses.

Embodiments are directed to the use of catalyst zoning strategies that can enhance the performance of Pt/Pd catalysts in lean burn engine applications. While the catalyst can be used in any lean burn engine, including diesel engines, lean burn gasoline direct injection engines, and compressed natural gas engines, in specific embodiments, the catalysts are to be used in heavy duty diesel applications. Heavy duty diesel engines include engines on vehicles of GVWR (gross vehicle weight rating) of above 8,500 pounds. As the skilled artisan understands there are various subgroups of heavy duty vehicles, such as light-heavy duty diesel engines, medium heavy duty diesel engines and heavy heavy duty diesel engines (over 33,000 GVWR, and including urban buses). The present invention may also have applicability to nonroad diesel engines, which includes engines that are used off-road, such as on farms and in construction. Heavy duty diesel engines may also include the following nonroad categories of engines: locomotives; marine engines; engines used in underground mining equipment, stationary and hobby engines.

Although platinum has good light-off characteristics for CO and HC and has been a preferred precious metal for catalyst compositions to abate diesel engine exhaust, palladium has become of interest due to its relatively lower cost.

Zone coating of a catalyst washcoat is a technique used to improve catalyst performance under transient engine operation. Zone coating is usually accomplished by segregating the precious metal composition and/or the amount of precious metal, into specific locations (or zones) throughout a substrate (e.g., a monolithic catalyst honeycomb carrier). Zone coating allows for the placement of metal oxide washcoat materials and other washcoat additives in specific locations that best enhance the performance of the supported precious metals. Typically, an increased amount of precious metal (particularly Pt) is localized on the front (inlet) portion of the carrier to achieve faster light-off for fuel. Palladium can be localized on the rear (outlet) portion of the carrier since the carrier outlet is generally hotter due to catalyst light-off, and Pd has better resistance to thermal sintering than Pt.

According to one or more embodiments of the invention, it has been determined that a zoning configuration in which there is an elevated loading of PGM in an upstream zone that is shorter in length than a downstream zone that has a higher amount of platinum than palladium in the rear zone provides excellent light off of fuel. Embodiments of the present invention use a catalyst zoning strategy that can enhance the performance of Pt/Pd formulations in diesel applications by localizing a higher percentage of Pd in the front or first washcoat zone of the carrier with a corresponding higher percentage of Pt in the rear or second washcoat zone of the carrier. This zoning strategy may be particularly useful for fuel burning.

Another aspect of the invention pertains to a diesel oxidation catalyst that utilizes a high porosity support. As used herein, "high porosity support" refers to a refractory metal oxide support that has an average pore radius of at least 100 Angstroms, for example, an average in the range of 100 Angstroms to 150 Angstroms. In a specific embodiment, a high porosity refractory metal oxide support has an average pore radius of 120 Angstroms. As shown below, oxidation catalysts made with high porosity supports show improved fuel burning properties and enhanced $NO_2$ production, compared to lower porosity supports.

As used herein, the term "first" is used to denote the location of the diesel oxidation catalyst in the flow direction of the exhaust stream. Equivalent terms would be "leading" or "upstream" or "front" or "inlet."

As used herein, the term "second" is used to denote the located of the diesel oxidation catalyst in the flow direction of the exhaust stream. Equivalent terms would be "trailing" or "downstream" or "rear" or "outlet."

The first washcoat zone and the second washcoat zone can be present in the form of two separate components on two substrates forming two distinct and separate zones. Alternatively, the first washcoat zone can be on the upstream side of the substrate, while the second washcoat zone can be located on the downstream section of the same substrate.

The zoned catalyst design provides thermally durable $NO_2$ generation in conjunction with efficient heat-up performance, and low temperature fuel light off activity. Significantly, the zone catalyst provides both functions while, at the same time, minimizing PGM utilization and its associated impact on catalyst cost. A higher loaded first washcoat zone with a low Pt/Pd ratio followed by a lower loaded second washcoat zone with a high Pt/Pd ratio provides a catalyst with a balanced performance.

The zoning strategy of the present invention proceeds against conventional wisdom by providing an oxidation catalyst in which the majority of the platinum in the hottest portion of the carrier (i.e. the rear or second washcoat zone), where it may be more likely to sinter. The zone placement of the palladium and platinum provides a diesel oxidation catalyst with surprisingly good fuel light off, even after aging. Such a diesel oxidation catalyst is particularly useful for heavy duty diesel applications such as in trucks, buses and heavy equipment (tractors, bulldozers, etc).

In one or more embodiments, the oxidation catalyst composite comprises a substrate having a length, an inlet end and an outlet end, a catalytic material on the carrier. The catalytic material includes a first washcoat zone and a second washcoat zone. The first washcoat zone can comprise a first washcoat layer including platinum Pt and palladium Pd components and a first metal oxide support, the first washcoat zone adjacent the inlet end of the substrate. The second washcoat zone comprises a second washcoat layer including platinum Pt and palladium Pd components, and a second refractory metal oxide support, the second washcoat layer adjacent the outlet end of the substrate. The first washcoat zone has a length that is shorter than the second washcoat zone. The oxidation catalyst catalytic material does not include an elevated loading of PGM on the inlet face of the catalyst, and the first washcoat zone has a PGM loading at least twice that of the second washcoat zone. The first washcoat zone has a Pt/Pd ratio that is less than 3:1. In other words, the loading of Pt/Pd in relatively high in the first (front) washcoat zone, and the loading of Pt/Pd in the second (rear) washcoat zone is relatively low.

In one or more embodiments, the oxidation catalyst composite does not include an elevated loading of PGM on the inlet face of the catalyst.

In one or more embodiments, greater than 50% of the total PGM loading is applied to the front (inlet) or first washcoat zone of the substrate. In one or more embodiments, the first washcoat zone has a PGM loading at least twice that of the second washcoat zone. The ratio of the loading of the first washcoat zone to the loading of the second washcoat zone can be greater than 2:1 and up to 15:1 (including 2:1, 3:1, 4:1, 5:1, 10:1, and 15:1).

The first and second washcoat zones can consist of a platinum and palladium containing catalytically active coating on a ceramic or metal flow through honeycomb body. In one or more embodiments, the substrate is a through flow substrate composed of ceramic materials including, but not limited to, silicon carbide, cordierite, aluminum titanate, and mullite. In one or more embodiments, metallic through flow substrates can be used as the substrate. Ceramic flow through substrates such as a ceramic honeycomb body can be used as the substrate. Ceramic honeycomb bodies which have cell densities of 15 to 150 cells per square centimeter, or 60 to 100 cells per square centimeter can be used.

The ratio of platinum to palladium in the first washcoat zone can be varied over a wide range. As a result of varying the ratio of Pt/Pd in the first washcoat zone, it is possible to provide a cost-optimized exhaust system for diesel engines. In one or more embodiments, the first washcoat zone has a Pt:Pd ratio that is less than 3:1. In one or more embodiments, the first washcoat zone has a Pt:Pd ratio of 2:1 or 1 or 1:2, or even palladium only (0:1). In a specific embodiment, the first washcoat zone has a Pt:Pd ratio of 1:2. In one or more embodiments, the first washcoat zone can comprise Pd only. The loading for the first washcoat zone can be 30 to 110 g/ft$^3$ more specifically 30 to 80 g/ft$^3$, or more specifically 40 to 60 g/ft$^3$ of PGM.

The ratio of platinum to palladium in the second washcoat zone can also be varied over a wide range. In one or more embodiments, the second washcoat zone has a Pt:Pd ratio that is greater than 3:1. In one or more embodiments, the second washcoat zone has a Pt:Pd ratio of 5:1 or 8:1 or 10:1. In a specific embodiment, the second washcoat zone has a Pt:Pd ratio that is greater than 8:1. In a very specific embodiment, the second washcoat zone has a Pt:Pd ratio that is 10:1. In one or more embodiments, the second washcoat zone can comprise Pt only (Pt/Pd ratio of 1:0).

Reference to a catalyst composite or catalytic article means a catalytic article including a substrate, for example a honeycomb substrate, having one or more washcoat layers containing a catalytic component, for example, a PGM component that is effective to catalyze the burning of fuel.

As used herein, the terms "refractory metal oxide support" and "support" refer to the underlying high surface area material upon which additional chemical compounds or elements are carried. The support particles have pores larger than 20 Å and a wide pore distribution. As defined herein, such metal oxide supports exclude molecular sieves, specifically, zeolites. In particular embodiments, high surface area refractory metal oxide supports can be utilized, e.g., alumina support materials, also referred to as "gamma alumina" or "activated alumina," which typically exhibit a BET surface area in excess of 60 square meters per gram ("m$^2$/g"), often up to about 200 m$^2$/g or higher. Such activated alumina is usually a mixture of the gamma and delta phases of alumina, but may also contain substantial amounts of eta, kappa and theta alumina phases. Refractory metal oxides other than activated alumina can be used as a support for at least some of the catalytic components in a given catalyst. For example, bulk ceria, zirconia, alpha alumina and other materials are known for such use. Although many of these materials suffer from the disadvantage of having a considerably lower BET surface area than activated alumina, that disadvantage tends to be offset by a greater durability or performance enhancement of the resulting catalyst. "BET surface area" has its usual meaning of referring to the Brunauer, Emmett, Teller method for determining surface area by N$_2$ adsorption. Pore diameter and pore volume can also be determined using BET-type N$_2$ adsorption or desorption experiments.

In one or more embodiments, the refractory metal oxide support is a large pore alumina or silica-alumina. The support has pores larger than 90 Å. The large pore alumina is highly porous with a narrow pore distribution.

As used herein, molecular sieves, such as zeolites refer to materials, which may in particulate form support catalytic precious group metals, the materials having a substantially uniform pore distribution, with the average pore size being no larger than 20 Å. Reference to a "non-zeolite support" in a catalyst layer refers to a material that is not a molecular sieve or zeolite and that receives precious metals, stabilizers, promoters, binders, and the like through association, dispersion, impregnation, or other suitable methods. Examples of such supports include, but are not limited to, high surface area refractory metal oxides. One or more embodiments of the present invention include a high surface area refractory metal oxide support comprising an activated compound selected from the group consisting of alumina, zirconia, silica, titania, silica-alumina, zirconia-alumina, titania-alumina, lanthana-alumina, lanthana-zirconia-alumina, baria-alumina, baria-lanthana-alumina, baria-lanthana-neodymia-alumina, zirconia-silica, titania-silica, or zirconia-titania.

Reference to "impregnated" means that a precious metal-containing solution is put into pores of a material such as a zeolite or a non-zeolite-support. In detailed embodiments, impregnation of precious metals is achieved by incipient wetness, where a volume of diluted precious metal-containing solution is approximately equal to the pore volume of the support bodies. Incipient wetness impregnation generally leads to a substantially uniform distribution of the solution of the precursor throughout the pore system of the material. Other methods of adding precious metal are also known in the art and can be used.

In one or more embodiments, the diesel oxidation catalyst is applied to one or more oxide support materials selected from aluminum oxide, lanthanum-oxide stabilized aluminum oxide, aluminosilicate, silicon dioxide, titanium dioxide, cerium oxide, cerium-zirconium mixed oxides, rare-earth metal sesquioxide, zeolite, and mixtures thereof. In one or more embodiments, aluminum oxide, lanthanum oxide-stabilized aluminum oxide, aluminosilicate, titanium dioxide, and zeolite are used as refractory metal oxide support materials. In an embodiment, the first washcoat zone and second washcoat zone are applied to aluminum oxide and/or aluminosilicate support materials. The diesel oxidation catalyst plus the refractory metal oxide support or washcoat is then applied to a through flow substrate.

Details of the components of a gas treatment article and system according to embodiments of the invention are provided below.

The Substrate

As used herein, the term "substrate" refers to the monolithic material onto which the refractory metal oxide support is placed, typically in the form of a washcoat containing a plurality of supports having catalytic species thereon. According to one or more embodiments, the substrate may be any of those materials typically used for preparing DOC catalysts and will preferably comprise a metal or ceramic honeycomb structure. Any suitable substrate may be employed, such as a monolithic substrate of the type having a plurality of fine, parallel gas flow passages extending therethrough from an inlet or an outlet face of the substrate, such that passages are open to fluid flow therethrough. The passages, which are essentially straight paths from their fluid inlet to their fluid outlet, are defined by walls in which the catalytic material is coated as a "washcoat" so that the gases flowing through the passages contact the catalytic material. A washcoat is formed by preparing a slurry containing a specified solids content (e.g., 30-50% by weight) of supports in a liquid vehicle, which is then coated onto a substrate and dried to provide a washcoat layer.

The flow passages of the monolithic substrate are thin-walled channels which can be of any suitable cross-sectional shape and size such as trapezoidal, rectangular, square, sinusoidal, hexagonal, oval, circular, etc. Such structures may contain from about 60 to about 600 or more gas inlet openings (i.e., "cells") per square inch of cross section.

The ceramic substrate may be made of any suitable refractory material, e.g., cordierite, cordierite-α alumina, silicon nitride, silicon carbide, zircon mullite, spodumene, alumina-silica magnesia, zircon silicate, sillimanite, magnesium silicates, zircon, petalite, α-alumina, aluminosilicates and the like.

The substrates useful for the layered oxidation catalyst composites according to one or more embodiments may also be metallic in nature and may be composed of one or more metals or metal alloys. The metallic substrates may be employed in various shapes such as corrugated sheet or monolithic form. Suitable metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt % of the alloy, e.g., 10-25 wt % of chromium, 3-8 wt % of aluminum and up to 20 wt % of nickel. The alloys may also contain small or trace amounts of one or more other metals such as manganese, copper, vanadium, titanium and the like. The surface or the metal substrates may be oxidized at high temperatures, e.g., 1000° C. and higher, to improve the corrosion resistance of the alloy by forming an oxide layer on the surface the substrate. Such high temperature induced oxidation may enhance the adherence of the refractory metal oxide support and catalytically-promoting metal components to the substrate.

Preparation of Catalyst Composites

The catalyst composites according to one or more embodiments may be formed in a single layer or in multiple layers. In some circumstances, it may be suitable to prepare one slurry of catalytic material and use this slurry to form multiple layers on the substrate. The catalyst composites can be prepared by known processes, e.g. incipient wetness. A representative process is set forth below. As used herein, the term "washcoat" has its usual meaning of a thin, adherent coating of a catalytic or other material applied to a substrate material, such as a honeycomb-type substrate member, which is sufficiently porous to permit the passage therethrough of the gas stream being treated.

The catalyst composite can be prepared in layers on a monolith substrate. For a first layer of a specific washcoat, finely divided particles of a high surface area refractory metal oxide such as gamma alumina are slurried in an appropriate vehicle, e.g. water. The substrate may then be dipped one or more times in such slurry or the slurry may be coated on the substrate such that there will be deposited on the substrate the desired loading of the metal oxide. To incorporate components such as precious metals (e.g. palladium, platinum, rhodium, and/or combinations) and stabilizers and/or promoters, such components may be incorporated in the slurry prior to substrate coating as a mixture of water soluble or water-dispersible compounds or complexes. Thereafter, the coated substrate is calcined by heating, e.g., at 400-600° C. for about 10 minutes to about 4 hours. When palladium Pd is desired, the palladium component is used in the form of a compound or complex to achieve dispersion of the component on the refractory metal oxide support, e.g. activated alumina. As used herein, the term "palladium component" refers to any compound, complex, or the like which, upon calcinations or use thereof, decomposes or otherwise converts to a catalytically active form, usually the metal or the metal oxide. Water-soluble compounds or water-dispersible compounds or complexes of the metal component may be used as long as the liquid medium uses to impregnate or deposit the metal component onto the refractory metal oxide support particles does not adversely react with the metal or its compound or its complex or other components which may be present in the catalyst composition and is capable of being removed from the metal component by volatilization or decomposition upon heating and/or application of a vacuum. In some cases, the completion of removal of the liquid may not take place until the catalyst is placed into use and subjected to the high temperatures encountered during operation. Generally, aqueous solutions of soluble compounds or complexes of the precious metals are used. Non-limiting examples of suitable compounds include palladium nitrate, tetraamine palladium nitrate, platinum chloride, and platinum nitrate. During the calcinations step, or at least during the initial phase of use of the composite, such compounds are converted into a catalytically active form of the metal or a compound thereof.

A suitable method of preparing any layer of the layered catalyst composite of the invention is to prepare a mixture of a solution of a desired precious metal compound (e.g., a palladium compound) and at least one support, such as a finely divided, high surface area, refractory metal oxide support, e.g., gamma alumina, which is sufficiently dry to absorb substantially all of the solution to form a wet solid which is later combined with water to form a coatable slurry. In one or more embodiments, the slurry is acidic, having, for example, a pH of about 2 to less than about 7. The pH of the slurry may be lowered by the addition of an adequate amount of an inorganic acid or an organic acid to the slurry. Combinations of both can be used when compatibility of acid and raw materials is considered. Inorganic acids include, but are not limited to, nitric acid. Organic acids include, but are not limited to, acetic, propionic, oxalic, malonic, succinic, glutamic, adipic, maleic, fumaric, phthalic, tartaric, citric acid and the like. Thereafter, if desired, water-soluble or water-dispersible compounds and/or stabilizers, e.g., barium acetate, and a promoter, e.g., lanthanum nitrate, may be added to the slurry.

A suitable method of preparing any layer of the layered catalyst composite is to prepare a mixture of a solution of a desired precious metal compound (e.g. a palladium compound) and at least one support, such as a finely divided, high surface area, refractory metal oxide support, e.g. gamma alumina, which is sufficiently dry to absorb substantially all of the solution to form a wet solid, which is later combined with water to form a coatable slurry. In one or more embodiments, the slurry is acidic, having, for example, a pH of about 2 to less than about 7.

In one or more embodiments, the slurry is pulverized to result in substantially all of the solids having particle sizes of less than 18 micron. The pulverization may be accomplished in a ball mill or other similar equipment, and the solids content of the slurry may be, e.g., about 20-60 wt % or 30-40 wt %.

Additional layers, i.e., second and third layers may be prepared and deposited upon the first layer in the same manner as described for the deposition of the first layer upon the substrate.

Palladium has become of greater interest for use in DOCs due to its relatively lower cost. However, cost is not the only factor to consider in the design of an oxidative catalyst composition. Regardless of cost, if a particular catalyst is susceptible to poisoning or degradation in a particular engine exhaust environment, that particular material will not be used in a catalyst composition. Palladium may have performance advantages over platinum in diesel engines, particularly heavy duty diesel engines. For example, platinum is susceptible to inhibition (i.e. poisoning) by CO at high concentrations, and platinum has poor performance for oxidation of methane. Palladium, on the other hand, is not self-inhibited by CO and is known to be more effective than platinum for methane oxidation. Since increased CO and methane emission are expected from some diesel engines, use of palladium may have significant benefit.

Figure 2:
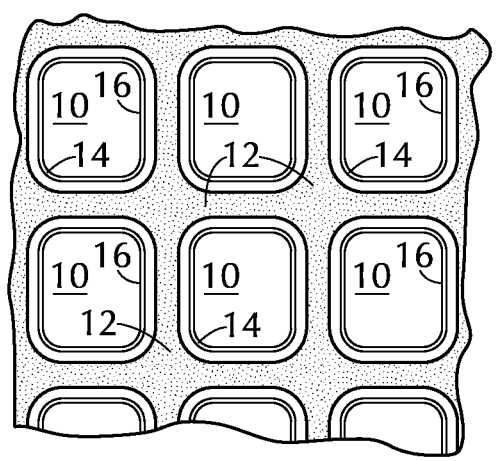
FIG. 2 is a partial cross-sectional view enlarged relative to FIG. 1, which shows an enlarged view of one of the gas flow passages shown in FIG. 1.

The catalyst composite according to one or more embodiments may be more readily appreciated by references to FIGS. 1 and 2. FIGS. 1 and 2 show a refractory substrate member 2, in accordance with one or more embodiments. Referring to FIG. 1, the refractory substrate member 2 is a cylindrical shape having a cylindrical outer surface 4, an upstream end face 6 and a downstream end face 8, which is identical to end face 6. Substrate member 2 has a plurality of fine, parallel gas flow passages 10 formed therein. As see in FIG. 2, flow passages 10 are formed by walls 12 and extend through substrate 2 from upstream end face 6 to downstream end face 8, the passages 10 being unobstructed so as to permit the flow of a fluid, e.g., a gas stream, longitudinally through substrate 2 via gas flow passages 10 thereof. As is more easily seen in FIG. 2, walls 12 are so dimensioned and configured that gas flow passages 10 have a substantially regular polygonal shape, substantially square in the illustrated embodiment, but with rounded corners in accorded with U.S. Pat. No. 4,335,023. A first washcoat layer 14 is adhered to or coated onto the walls 12 of the substrate member. As shown in FIG. 2, a second washcoat layer 16 is coated over the first washcoat layer 14. In one or more embodiments, an undercoat (not shown) can be applied to the substrate beneath the first washcoat layer 14.

As show in FIG. 2, the substrate member 2 includes void spaces provided by the gas-flow passages 10, and the cross-sectional area of these passages 10 and the thickness of the walls 12 defining the passages will vary from one type of substrate member to another. Similarly, the weight of washcoat applied to such substrates will vary from case to case. Consequently, in describing the quantity of washcoat or catalytic metal component or other component of the composition, it is convenient to use units of weight of component per unit volume of catalyst substrate. Therefore, the units grams per cubic inch ("g/in$^3$") and grams per cubic foot ("g/ft$^3$") are used herein to mean the weight of a component per volume of substrate member, including the volume of void spaces of the substrate member.

In another embodiment, the washcoat layers may be zone coated such that the first washcoat zone is on the upstream end, and the second washcoat zone is on the downstream end of the substrate. For example, an upstream or first washcoat zone can be coated over a portion of the upstream region of the substrate, and a downstream or second washcoat zone can be coated over a portion of the downstream region of the substrate. In embodiments, the length of the first washcoat zone is shorter than the length of the second washcoat zone.

Figure 3A:
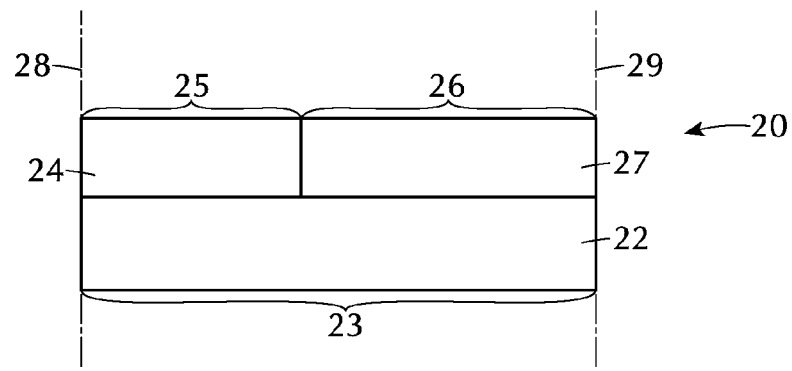
FIGS. 3A and 3B show a cross-sectional view of oxidation catalyst composites according to various embodiments.
Figure 3B:
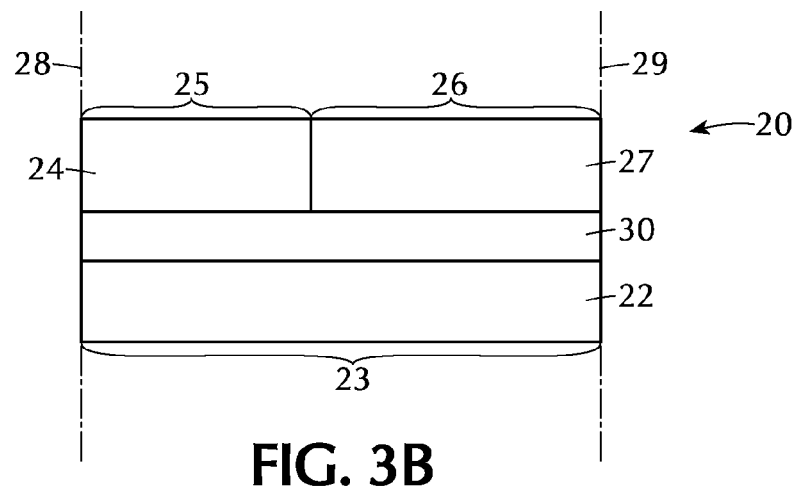

The catalyst composite embodiments including the first washcoat zone and the second washcoat zone may be more easily understood by reference to FIGS. 3A and 3B. FIG. 3A shows an embodiment of a zoned oxidation catalyst composite 20 for abatement of exhaust gas emissions from a diesel engine. A substrate 22, for example, a honeycomb monolith, having a length 23 and an inlet or upstream end 28 and an outlet or downstream end 29 contains two separate coated washcoat zones. The first washcoat zone 24 is located adjacent to the upstream or inlet end 28 of the substrate 22 and comprises a first washcoat layer including Pt and Pd components and a first refractory metal oxide support. A second washcoat zone 27 is located adjacent to the outlet or downstream end 29 and includes Pt and Pd components and a second refractory metal oxide support. The first washcoat zone 24 on the upstream or inlet end 28 has a length 25 that is shorter than the length 26 of the second washcoat zone 27 on the downstream or outlet end 29 of the substrate 22. The oxidation catalyst composite 20 does not include an elevated loading of platinum group metal (PGM) on the inlet face 28 of the catalyst. The first washcoat zone 24 has a PGM loading that is at least twice that of the second washcoat zone 27, and the first washcoat zone 24 has a Pt:Pd ratio that is less than 3:1.

In one or more embodiments, the second washcoat zone 27 has a Pt:Pd ratio that is greater than 3:1. In a specific embodiment, the Pt:Pd ratio in the second washcoat zone 27 is greater than 5:1. In a more specific embodiment, the Pt:Pd ratio in the second washcoat zone 27 is greater than 1:1. In one or more embodiments, the second washcoat zone 27 can comprise only Pt.

The first washcoat zone 24 extends from the inlet end 28 of the substrate 22 and has a length 25 that extends through the range of about 5% and about 49% of the length 23 of the substrate 22. The second washcoat zone 27 extends from the outlet end 29 of the substrate 22 and has a length 26 that is longer than the length 25 of the first washcoat zone 24. The length 29 of the second washcoat zone 27 extends for about 51% to about 95% of the length 23 of the substrate 22. In one or more embodiments, the length 25 of the first washcoat zone 24 is 25% of the length 23 of the substrate 22, and the length 29 of the second washcoat zone 27 is about 75% of the length 23 of the substrate 22. In one embodiment, the first zone is in the range of 20% to 40% of the length of the substrate, and more specifically, 25% to 35% of the substrate. According to one or more embodiments, the first washcoat zone promotes efficient burning diesel fuel to create an exotherm to regenerate a downstream particulate filter, and the second washcoat promotes the oxidation of NO to $NO_2$, which can promote the fast SCR reaction in a downstream SCR catalyst.

According to one or more embodiments, as shown in FIG. 3B, an undercoat layer 30 may be applied to the substrate 22 prior to the first washcoat zone 24 or the second washcoat zone 27, whichever is applied first. In a specific embodiment, the undercoat 30 contains no precious metal component intentionally added to the undercoat composition. For example, the undercoat may comprise a refractory oxide support. Through diffusion or migration, however, some Pd or Pd from the first washcoat zone 24 or the second washcoat zone 27 may be present in the undercoat layer 30. The compositions of the first washcoat zone 24 and second washcoat zone 26 can be as described above with respect to FIG. 3A.

In one or more embodiments, the washcoat loading is the same in the first washcoat zone and the second washcoat zone. In other embodiments, the washcoat loading is different in the first washcoat zone than in the second washcoat zone. In one or more embodiments, the first washcoat zone has a PGM loading that is at least twice that of the second washcoat zone. Suitable loadings for the components in the first and second washcoat layers are as follows.

In one or more embodiments, the first washcoat zone can further comprise an alkaline earth metal selected from Ba, Be, Mg, Ca, Sr, and Ra. In a specific embodiment, the first washcoat zone further comprises Ba. The alkaline earth can be present in an amount of from about 20 g/ft$^3$ to about 120 g/ft$^3$ (including 20, 30, 40, 50, 60, 70, 80, 90, 100, 110 and 120 g/ft$^3$).

The oxidation catalyst composite can be used in an integrated emission treatment system comprising one or more additional components for the treatment of diesel exhaust gas emissions. For example, the emission treatment system may comprise a soot filter component and/or a selective catalytic reduction (SCR) catalytic article.

In addition to treating the exhaust gas emissions via use of the oxidation catalyst composite according to one or more embodiments, a soot filter for removal of particulate matter may be used. The soot filter may be located upstream or downstream from the oxidation catalyst composite, but, typically, the soot filter will be located downstream from the oxidation catalyst composite. In one or more embodiments, the soot filter is a catalyzed soot filter (CSF). The CSF may comprise a substrate coated with a washcoat layer containing one or more catalysts for burning off trapped soot and/or oxidizing exhaust gas stream emissions. In general, the soot burning catalyst can be any known catalyst for combustion of soot. For example, the CSF can be coated with one or more high surface area refractory oxides (e.g., an aluminum oxide or ceria-zirconia) for the combustion of unburned hydrocarbons and to some degree particulate matter. The soot burning catalyst can be an oxidation catalyst comprising one or more precious metal (PM) catalysts (platinum, palladium, and/or rhodium).

In one or more embodiments, the system comprises an exhaust conduit in fluid communication with diesel engine via an exhaust manifold, the oxidation catalyst composite according to one or more embodiments wherein the substrate is a flow through substrate or a wall-flow substrate, and a catalyzed soot filter and an SCR catalyst located downstream from the oxidation catalyst composite In general, any known filter substrate can be used, including, e.g., a honeycomb wall flow filter, wound or packed fiber filter, open-cell foam, sintered metal filter, etc., with wall flow filters being preferred. Wall flow substrates useful for supporting the CSF compositions have a plurality of fine, substantially parallel gas flow passages extending along the longitudinal axis of the substrate. Typically, each passage is blocked at one end of the substrate body, with alternate passages blocked at opposite end-faces. Such monolithic carriers may contain up to about 700 or more flow passages (or "cells") per square inch of cross section, although far fewer may be used. For example, the carrier may have from about 7 to 600, more usually from about 100 to 400, cells per square inch ("cpsi"). The cells can have cross sections that are rectangular, square, circular, oval, triangular, hexagonal, or are of other polygonal shapes. Wall flow substrates typically have a wall thickness between 0.002 and 0.1 inches. Preferred wall flow substrates have a wall thickness of between 0.002 and 0.015 inches.

Typical wall flow filter substrates are composed of ceramic-like materials such as cordierite, a-alumina, silicon carbide, silicon nitride, zirconia, mullite, spodumene, alumina-silica-magnesia or zirconium silicate, or of porous, refractory metal. Wall flow substrates may also be formed of ceramic fiber composite materials. Preferred wall flow substrates are formed from cordierite and silicon carbide. Such materials are able to withstand the environment, particularly high temperatures, encountered in treating the exhaust streams.

The exhaust gas treatment system may further comprise a selective catalytic reduction (SCR) component. The SCR component may be located upstream or downstream of the DOC and/or soot filter. Preferably, the SCR component is located downstream of a soot filter component. A suitable SCR catalyst component for use in the emission treatment system is able to effectively catalyze the reduction of the $NO_x$ component at temperatures below 600° C., so that adequate $NO_x$ levels can be treated even under conditions of low load which typically are associated with lower exhaust temperatures. Preferably, the catalyst article is capable of converting at least 50% of the $NO_x$ component to $N_2$, depending on the amount of reductant added to the system. Another desirable attribute for the composition is that it possesses the ability to catalyze the reaction of $O_2$ with any excess $NH_3$ to $N_2$ and $H_2O$, so that $NH_3$ is not emitted to the atmosphere. Useful SCR catalyst compositions used in the emission treatment system should also have thermal resistance to temperatures greater than 650° C. Such high temperatures may be encountered during regeneration of the upstream catalyzed soot filter.

Suitable SCR catalyst compositions are described, for instance, in U.S. Pat. No. 4,961,917 (the '917 patent) and U.S. Pat. No. 5,516,497, which are both hereby incorporated by reference in their entirety. Compositions disclosed in the '917 patent include one or both of an iron and a copper promoter present in a zeolite in an amount of from about 0.1 to 30 percent by weight, preferably from about 1 to 5 percent by weight, of the total weight of promoter plus zeolite. In addition to their ability to catalyze the reduction of $NO_x$ with $NH_3$ to $N_2$, the disclosed compositions can also promote the oxidation of excess $NH_3$ with $O_2$, especially for those compositions having higher promoter concentrations. Other specific SCR compositions that may be used in accordance with one or more embodiments of the invention include 8-ring, small pore molecular sieves, for example, those having the structure type selected from the group consisting of AEI, AFT, AFX, CHA, EAB, ERI, KFI, LEV, SAS, SAT, and SAV. In a specific embodiment, the 8-ring small pore molecular sieve has the CHA structure and is a zeolite. The CHA zeolite may contain copper. Exemplary CHA zeolites have a silica to alumina ratio (SAR) greater than about 15, and copper content exceeding about 0.2 wt %. In a more specific embodiment, the mole ratio of silica to alumina is from about 15 to about 256, and copper content from about 0.2 wt % to about 5 wt %. Other useful compositions for SCR include nonzeolitic molecular sieves having the CHA crystal structure. For example, silicoaluminophosphates such as SAPO-34, SAPO-44 and SAPO-18 may be used in accordance with one or more embodiments. Other useful SCR catalysts can include a mixed oxide including one or more of $V_2O_5$, $WO_3$ and $TiO_2$.

For an SCR reaction, there are three reaction conditions can be considered depending on the $NO_2/NO$ ratio:

(1) Standard:

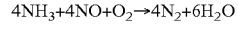
$$4NH_3+4NO+O_2 \rightarrow 4N_2+6H_2O$$

(2) "Fast":

$$4NH_3+2NO+2NO_2 \rightarrow 4N_2+6H_2O$$

(3) "Slow":

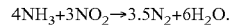
$$4NH_3+3NO_2 \rightarrow 3.5N_2+6H_2O.$$

According to embodiments of the invention, the PGM on the diesel oxidation catalyst can contribute promoting the fast SCR reaction, and tailoring the PGM loading and ratio can be used to achieve this. According to an embodiment of the invention, the oxidation catalyst provides an optimized $NO_2/NO_x$ ratio in the exhaust for promoting the SCR reaction, in particular, what is known as the "fast" SCR reaction.

The system may further include a $NO_x$ storage and release (NSR) catalytic article. In certain embodiments, one or the other of an SCR or NSR catalytic article is included in the system.

Figure 4:
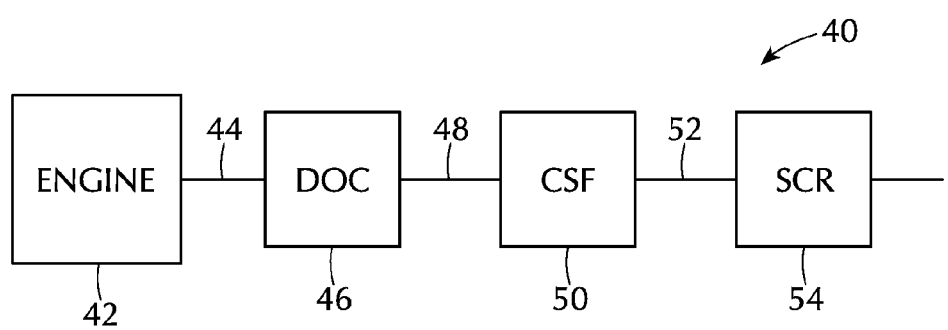
FIG. 4 is a schematic of an engine emission treatment system in accordance with one or more embodiments.

In one or more embodiments, the emission treatment system comprises one or more additional components for the treatment of diesel gas emission. An exemplified emission treatment system may be more readily appreciated by reference to FIG. 4, which depicts a schematic representation of an emission treatment system 40 in accordance with one or more embodiments. Referring to FIG. 4, an exhaust gas stream containing gaseous pollutants (e.g. unburned hydrocarbons, carbon monoxide, and $NO_x$) and particulate matter is conveyed via conduit line 44 from an engine 42 to a diesel oxidation catalyst (DOC) 46, which is coated with the zone oxidation catalyst composite according to various embodiments. In the DOC 46, unburned gaseous and non-volatile hydrocarbons (e.g. the soluble organic fraction or SOF) and carbon monoxide are largely combusted to form carbon dioxide and water. Additionally, a proportion of the NO of the $NO_x$ component may be oxidized to $NO_2$ in the DOC 46. The exhaust stream is next conveyed via conduit line 48 to a catalyzed soot filter (CSF) 50, which traps particulate matter present within the exhaust gas stream. The CSF 50 is optionally catalyzed for passive regeneration. After the removal of particulate matter via CSF 50, the exhaust gas stream is conveyed via conduit line 52 to a downstream selective catalytic reduction (SCR) component 54 for the treatment and/or conversion of $NO_x$. It is noted that the DOC 46 may be placed in a close-coupled position.

One or more embodiments are direct to methods for treating a diesel exhaust gas stream comprising carbon monoxide, hydrocarbons, and $NO_x$. The exhaust gas stream is passed through an inlet end towards and outlet end of a catalyzed soot filter, the exhaust gas first passing through a first washcoat zone on the catalyzed soot filter comprising a first washcoat layer including Pt and Pd components and a first refractory metal oxide support, and then passing the exhaust gas stream through a second washcoat zone on the catalyzed soot filter comprising a second washcoat layer including platinum and palladium components and a second refractory metal oxide support. The first washcoat zone has a length that is shorter than the second washcoat zone. The first washcoat zone has a PGM loading that is at least twice that of the second washcoat zone. The first washcoat zone has a Pt/Pd ratio that is less than 3:1.

In other embodiments, the diesel exhaust gas stream subsequent to contacting the CSF is directed to a selective catalytic reduction component located downstream of the CSF.

The invention is now described with reference to the following examples. Before describing several exemplary embodiments of the invention, it is to be understood that the invention is not limited to the details of construction or process steps set forth in the following description. The invention is capable of other embodiments and of being practiced or being carried out in various ways.

EXAMPLES

Comparative Example 1

Sample A (Uniform Coat)

A washcoated Pt/Pd composition was prepared with a uniform mixture of Pt and Pd on a support of a 50/50 mixture of a pseudoboehmite alumina and a 4% lanthana stabilized alumina support by coating a Pt- and Pd-containing aqueous slurry onto a cordierite honeycomb monolith substrate. The total precious metal loading was 40 g/ft$^3$, and the Pt/Pd ratio was 10:1. The Pt- and Pd-containing aqueous slurry was prepared as follows:

An undercoat was applied to a 300 cpsi cordierite honeycomb substrate core 1" D×3" L by applying a washcoat of a pseudoboehmite alumina milled to a particle size to 90% less than 10 µM to a loading 1 g/in$^3$.

A topcoat was prepared as follows. A support material comprising a 50/50 mixture of a pseudoboehmite alumina and a 4% lanthana stabilized alumina having a $D_{90}$ particles in the range of 10-12 microns was impregnated with a water soluble Pt salt using incipient wetness techniques. Subsequently, the same support material comprising was impregnated with a water soluble Pd salt using incipient wetness techniques. The resulting Pd and Pt-impregnated powders were placed into deionized water with zirconium acetate (5% of total slurry solids by weight $ZrO_2$), and the pH of the resulting aqueous slurry was reduced to pH by the addition of an organic acid. After reducing the particle size to 90% less than 10 µM by milling, the slurry was coated onto the cordierite substrate containing the undercoat. The coated monolith was dried and then calcined in the range of 400-550° C. for 2-4 hours. The total washcoat loading of the topcoat of approximately 2.1 g/in$^3$ for a PGM loading 40 g/ft$^3$.

Comparative Example 2

Sample B (Zoned Catalyst with Pt/Pd Ratio 10:1 in First Zone)

Washcoats were made in a way similar to Comparative Example 1, and an undercoat was applied to the honeycomb substrate. An inlet (front) zone washcoat was applied at PGM loading 40 g/ft$^3$, and an outlet (rear) zone at a PGM loading of 20 g/ft$^3$. Each zone had a Pt/Pd ratio of 10:1. Each zone had approximately the same length.

Example 3

Sample C

A washcoated Pt/Pd composition was prepared the same was as Comparative Example 2 above, with the inlet zone precious metal loading was 40 g/ft$^3$ and the Pt/Pd ratio was 2:1; the rear zone had a PGM loading of 20 g/ft$^3$ and the Pt/Pd ratio was 10:1.

Example 4

Sample Catalyst D

Washcoats were made and applied in a way similar to Example 3, except that the support particles were a pure alumina support with a large pore volume (average pore radius 120 Angstroms) milled to a particle size of $D_{90}$ 18-20 microns.

Example 5

Sample Catalyst E

A catalytic article was prepared similarly to Example 4 except the inlet zone had a ratio of the Pt/Pd was 1:1. The loadings were the same in the inlet and outlet zone and the ratio in the outlet zone of Pt/Pd was 10:1

Example 6

Zoned Catalyst F

The zone catalyst describe in this example was prepared following the same procedure as described for Example 5, except that the inlet zone was all Pd (Pt:Pd=0:1).

Example 7

Zoned Catalyst G

The zone catalyst describe in this example was prepared following the same procedure as described for Example 5, except that the outlet washcoat zone comprised Pt/Pd in a ratio of 3:1 and the support was a silica-alumina (5% silica) with large pore volume.

Example 8

Zoned Catalyst H

The zone catalyst describe in this example was prepared following the same procedure as described for Example 7, except that the outlet washcoat zone comprised Pt/Pd in a ratio of 5:1.

Example 9

Zoned Catalyst I

The zone catalyst describe in this example was prepared following the same procedure as described for Example 7, except that the outlet washcoat zone comprised Pt/Pd in a ratio of 10:1.

Example 10

Zoned Catalyst J

The zone catalyst describe in this example was prepared following the same procedure as described for Example 7, except that the outlet washcoat zone comprised all Pt (Pt:Pd=1:0).

Example 11

Zoned Catalyst K

Example 11 comprised a full sized honeycomb substrate 300 cpsi 10.5" D×6" L similar to the Comparative Example 2 above, with the inlet and outlet zones being equal in length. The total PGM loading was 10:1, and the inlet zone had a PGM 60 g/ft$^3$ and the outlet zone had a rear PGM loading of 20 g/ft$^3$.

Example 12

Zoned Catalyst L

Example 12 was prepared similar to Example 11, except the support particles were a pure alumina support with a large pore volume (average pore radius 120 Angstroms) milled to a particle size of $D_{90}$ 18-20 microns. The total PGM loading was 40 g/ft$^3$. The inlet zone was 33% of the total length of the substrate, and the outlet zone was 67% of the total length. The inlet zone PGM loading was 57.5 g/ft$^3$ with a Pt/Pd ratio of 1:2 and the outlet zone PGM loading was 20 g/ft$^3$ with a Pt/Pd ratio of 10:1.

Example 13

Zoned Catalyst M

Example 13 was similar to Example 12 except the support particles were a ~5% silica-alumina with a particle size $D_{50}$ of 6 microns.

Example 14

Zoned Catalyst N

Example 14 was similar to Example 13, except there was no undercoat Sample Testing

Examples 1-10

Fuel Light-Off

Examples 1-10 were tested on 1" D×3"L core samples on 300 CPSI/5 mil honeycomb substrate core sample. The samples from Examples 1-10 were tested in a laboratory reactor under simulated heavy duty diesel conditions. Each of the samples was aged at 700° C. for 5 hour in air and 10% steam. The space velocity was 100,000/h. The gas composition was 8% $O_2$, with the balance $N_2$. The simulated exhaust gas was maintained in a range starting at 300° C., then 275° C. and 250° C. to test for fuel light off. Diesel fuel was injected into the gas stream to simulate an active regeneration cycle, and the injection rate increased as the inlet gas temperature was lowered. The target temperature of the gas exiting the DOC was 600° C.

Examples 1-10

NO Oxidation

Selected core samples from Examples 1-10 were also tested for NO oxidation under the following conditions. The gas composition was CO 500 ppm, total HC 400 ppm, $O_2$ 10%, NO 300 ppm, $CO_2$ 5% and $H_2O$ 5% at a space velocity of 50,000/h.

Examples 11-14

Engine Testing

The coated catalyst compositions prepared in Examples 11-14 were tested in the following manner. First the coated monoliths were mounted in the exhaust stream of a diesel test engine and then subjected to high temperature post-injection aging. This was accomplished by maintaining the temperature at the inlet (front) face of the catalyst at 400° C. and then periodically injecting fuel into the exhaust gas stream in front of the catalyst. The injected fuel passed into the catalyst and was combusted, thereby increasing the temperature measured at the outlet (rear) face of the catalyst. The temperature at the outlet (rear) face of the catalyst was controlled by controlling the amount of fuel injected into the exhaust stream. Using this method, the temperature at the rear of the catalyst was at 650° C. for 50 hours. The fuel burning capability was tested at various temperatures and space velocities to determine the lowest temperate at which the catalyst is active for sustained fuel burning. During the runs, $NO_x$ out of the DOC was measured.

After aging, the coated monoliths were evaluated for diesel fuel combustion and NO oxidation performance on a test engine. The monoliths were individually mounted in the exhaust stream of a diesel engine that had typical engine out $NO_x$ and soot emissions.

Test results for the coated monoliths prepared in Examples 1-14 are provided in Table 1 below.

TABLE 1

| Example | Inlet Temperature (° C.) | Outlet Temperature (° C.) |
|---|---|---|
| Comp. 1 | 250 | 334 |
| Comp. 2 | 250 | 410 |
| 3 | 250 | 574 |
| 4 | 250 | 600 |
| 5 | 250 | 608 |
| 6 | 250 | 612 |

Examples 3-6 shows the benefit of catalysts prepared according to embodiments of the invention. The higher outlet temperature shows a more active catalyst for fuel burning. Example 4 shows the benefit of using an alumina support with a large pore volume.

Examples 7-10 NO Oxidation Data is shown in Table 2.

TABLE 2

| | $NO_2/NO_x$ % Temperature (° C.) | | |
|---|---|---|---|
| | 250 | 300 | 350 |
| Example 7 | 23.2 | 34.7 | 43.8 |
| Example 8 | 21.3 | 32.4 | 41.1 |
| Example 9 | 59.1 | 73.5 | 65.8 |
| Example 10 | 78.7 | 82.1 | 68.8 |

Table 2 shows that the $NO_2/NO_x$ can be tailored according to a particular application or engine strategy.

Further experiments were conducted to optimize the PGM loading in the inlet/front washcoat zone. As the total PGM loading was increased (30, 40, 50, 65 g/ft$_3$) in the front zone on samples based on Example 6 above, it was shown that increased PGM loading resulted in higher outlet temperature.

Table 3 shows data for Examples 11 and 12.

TABLE 3

| | | $NO_2/NO_x$ % Inlet/Outlet Temperature (° C.) | | |
|---|---|---|---|---|
| | | 250° C. | 275° C. | 350° C. |
| Example 11 | 280/580 | X | X | X |
| Example 11 | 250/Unstable | X | X | X |
| Example 11 | 240/No Light Off | X | X | X |
| Example 12 | 280/580 | X | X | X |
| Example 12 | 250/575 | X | X | X |
| Example 12 | 240/565 | X | X | X |
| Example 12 | | 23 | 36 | 38 |

Example 12 showed improved fuel light off compared to Example 11, which did not light off at 240° C. and was unstable at 250° C.

Example 13 was tested, and the results are shown in Table 4.

TABLE 4

| | | $NO_2/NO_x$ % Inlet/Outlet Temperature (° C.) | | |
|---|---|---|---|---|
| | | 250° C. | 275° C. | 350° C. |
| Example 13 | 280/550 | X | X | X |
| Example 13 | 270/550 | X | X | X |
| Example 13 | 250/550 | X | X | X |
| Example 13 | | 15 | 15 | 23 |

Example 13 was a test to determine the lowest inlet temperature at which the DOC outlet temperature could reach 550° C. in sustained fuel combustion.

Example 14 was tested and the data is shown in Table 5.

TABLE 5

| | | $NO_2/NO_x$ % Inlet/Outlet Temperature (° C.) | |
|---|---|---|---|
| | | 250° C. | 300° C. |
| Example 14 | 250/520 | X | X |
| Example 14 | 225/490 | X | X |
| Example 14 | | 27 | 52 |

Table 5 shows that activity slightly diminished for fuel light off compared to Example 13.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. An oxidation catalyst composite for abatement of exhaust gas emissions from a diesel engine comprising:
    a substrate having a length, an inlet end and an outlet end,
        a catalytic material on the substrate, the catalytic material including a first washcoat zone and a second washcoat zone;
    the first washcoat zone comprising a first washcoat layer including platinum (Pt) and palladium (Pd) platinum group metal (PGM) components and a first refractory metal oxide support, the first washcoat zone adjacent the inlet end of the substrate; and
    the second washcoat zone comprising a second washcoat layer including platinum and palladium PGM components and a second refractory metal oxide support, the second washcoat layer adjacent the outlet end of the substrate; and wherein the first washcoat zone has a length that is shorter than the second washcoat zone, wherein the oxidation catalyst does not include an elevated PGM loading on the inlet face of the catalyst and the first washcoat zone has a PGM loading at least twice that of the second washcoat zone, and the first washcoat zone has a Pt/Pd ratio less than 3:1.

2. The oxidation catalyst composite of claim 1, wherein the second washcoat zone has a Pt:Pd ratio greater than 3:1.

3. The oxidation catalyst composite of claim 2, wherein the Pt:Pd ratio in the second washcoat zone is greater than 5:1.

4. The oxidation catalyst composite of claim 3, wherein the Pt:Pd ratio in the second washcoat zone is greater than 8:1.

5. The oxidation catalyst composite of claim 1, wherein the first refractory metal oxide support and second refractory metal oxide support comprises a large pore alumina.

6. The oxidation catalyst composite of claim 5, wherein the alumina is stabilized by doping.

7. The oxidation catalyst composite of claim 6, wherein the washcoat loading is the same in the first washcoat zone and the second washcoat zone.

8. The oxidation catalyst composite of claim 6, wherein the washcoat loading is different in the first washcoat zone than in the second washcoat zone.

9. The oxidation catalyst composite of claim 1, wherein the first washcoat zone comprises a Pt/Pd component in an amount in the range of about 40 $g/ft^3$ to 60 $g/ft^3$.

10. The oxidation catalyst composite of claim 9, wherein the first washcoat zone further comprises an alkaline earth metal in an amount in the range of about 60 $g/ft^3$ to 70 $g/ft^3$.

11. The oxidation catalyst composite of claim 1, wherein the second washcoat zone comprises a Pd/Pd component in an amount in the range of about 15 $g/ft^3$ to 25 $g/ft^3$.

12. The oxidation catalyst of claim 1, wherein the ratio of the length of the second washcoat zone to the length of the first washcoat zone is 1.5:1 or greater.

13. A system for treatment of a lean burn engine exhaust gas stream including hydrocarbons, carbon monoxide, and other exhaust components, the emission treatment system comprising:

an exhaust conduit in fluid communication with the lean burn engine via an exhaust manifold;

the oxidation catalyst composite of claim 1 wherein the substrate is a flow through substrate or a wall-flow substrate; and a catalyzed soot filter and an SCR catalyst located downstream from the oxidation catalyst composite.

14. The system of claim 13, wherein the SCR catalyst is loaded on the catalyzed soot filter.

15. A method for treating a diesel exhaust gas stream comprising passing the exhaust gas stream through an inlet end towards an outlet end of a catalyzed soot filter, the exhaust gas first passing through a first washcoat zone on the catalyzed soot filter comprising a first washcoat layer including platinum (Pt) and palladium (Pd) components and a first refractory metal oxide support, and then passing the exhaust gas stream through a second washcoat zone on the catalyzed soot filter comprising a second washcoat layer including platinum and palladium components and a second refractory metal oxide support, wherein the first washcoat zone has a length that is shorter than the second washcoat zone, wherein the first washcoat zone has a PGM loading at least twice that of the second washcoat zone, and the first washcoat zone has a Pt/Pd ratio less than 3:1.

16. The method claim 15, wherein the second washcoat zone has a Pt:Pd ratio greater than 3:1.

17. The method of claim 16, wherein the Pt:Pd ratio in the second washcoat zone is greater than 5:1.

18. The method of claim 17, wherein the Pt:Pd ratio in the second washcoat zone is greater than 8:1.

19. The method of claim 15, wherein the washcoat loading is the same in the first washcoat zone and the second washcoat zone.

20. The method of claim 15, wherein the washcoat loading is different in the first washcoat zone and the second washcoat zone.

21. The method of claim 15, wherein the oxidation catalyst composite is effective to abate carbon monoxide and hydrocarbons, and to oxidize NO to $NO_2$ from the exhaust gas stream.

* * * * *